United States Patent
Wong et al.

(10) Patent No.: US 9,426,808 B2
(45) Date of Patent: Aug. 23, 2016

(54) METHOD AND APPARATUS FOR RESOURCE ALLOCATION IN A MIMO COMMUNICATION SYSTEM

(71) Applicant: Alcatel Lucent, Boulogne Billancourt (FR)

(72) Inventors: Shin Horng Wong, Swidon (GB); Matthew Baker, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/386,668

(22) PCT Filed: Mar. 7, 2013

(86) PCT No.: PCT/EP2013/000669
§ 371 (c)(1),
(2) Date: Sep. 19, 2014

(87) PCT Pub. No.: WO2013/139439
PCT Pub. Date: Sep. 26, 2013

(65) Prior Publication Data
US 2015/0043341 A1    Feb. 12, 2015

(30) Foreign Application Priority Data
Mar. 19, 2012    (EP) ..................................... 12360019

(51) Int. Cl.
*H04W 72/04* (2009.01)
*H04L 5/00* (2006.01)
(Continued)

(52) U.S. Cl.
CPC ......... *H04W 72/0486* (2013.01); *H04B 7/0413* (2013.01); *H04L 5/0023* (2013.01); *H04W 28/0252* (2013.01); *H04W 72/06* (2013.01); *H04L 5/0064* (2013.01); *Y02B 60/50* (2013.01)

(58) Field of Classification Search
None
See application file for complete search history.

(56) References Cited

U.S. PATENT DOCUMENTS 7,630,338 B2 * 12/2009 Vesterinen ............ H04W 28/20
                                                                370/328
8,767,647 B2 *  7/2014 Heo ........................ H04L 5/001
                                                                370/329

(Continued)

FOREIGN PATENT DOCUMENTS

CN    101835191 A    9/2010
CN    101998641 A    3/2011

(Continued)

OTHER PUBLICATIONS

International Search Report for PCT/EP2013/000669 dated Jun. 3, 2013.

(Continued)

*Primary Examiner* — Hong Cho
(74) *Attorney, Agent, or Firm* — Fay Sharpe, LLP

(57) ABSTRACT

A method of controlling uplink multiple input multiple output transmission between user equipment and a base station of a wireless communications network, user equipment and a computer program product are disclosed. The method comprises the steps of: identifying whether insufficient capacity exists on a primary uplink stream to carry pending uplink data packets; and if insufficient capacity exists, preventing establishment of a secondary uplink stream when it is determined that pending uplink data packets which would not be carried by the primary uplink stream would under-utilize the secondary uplink stream. In this way, the disproportionate interference and consumption of resources that would otherwise result from the establishment of a secondary stream in order to carry relatively little data is avoided which reduces the resources utilized, increases power efficiency and minimizes interference.

25 Claims, 1 Drawing Sheet

(51) Int. Cl.
*H04B 7/04* (2006.01)
*H04W 28/02* (2009.01)
*H04W 72/06* (2009.01)

(56) References Cited

U.S. PATENT DOCUMENTS

| | | | |
|---|---|---|---|
| 2003/0161282 A1 | 8/2003 | Medvedev et al. | |
| 2004/0002364 A1 | 1/2004 | Trikkonen et al. | |
| 2006/0020700 A1* | 1/2006 | Qiu | H04L 12/5695 709/224 |
| 2007/0160162 A1 | 7/2007 | Kim et al. | |
| 2009/0268675 A1 | 10/2009 | Choi | |
| 2011/0090806 A1* | 4/2011 | Ozturk | H04L 1/0007 370/252 |
| 2011/0293025 A1 | 12/2011 | Mudulodu et al. | |
| 2011/0310986 A1 | 12/2011 | Heo et al. | |
| 2012/0134441 A1 | 5/2012 | Yokomakura et al. | |
| 2012/0170526 A1 | 7/2012 | Wei | |
| 2012/0177089 A1 | 7/2012 | Pelletier et al. | |
| 2012/0196643 A1 | 8/2012 | Xiao et al. | |
| 2013/0121265 A1* | 5/2013 | Awoniyi | H04W 24/10 370/329 |

FOREIGN PATENT DOCUMENTS

| | | | |
|---|---|---|---|
| CN | 102045825 A | 5/2011 | |
| JP | 2009-111781 A | 5/2009 | |
| JP | 2011-29743 A | 2/2011 | |
| WO | WO 2011/063050 A1 | 5/2011 | |
| WO | 2012094241 A1 | 7/2012 | |
| WO | 2013010467 A1 | 1/2013 | |

OTHER PUBLICATIONS

English Bibliography for Chinese Patent Application Publication No. CN101835191A, Published September 15, 2010, Printed From Thomson Innovation on May 29, 2015, 3 pp.

English Bibliography for Chinese Patent Application Publication No. CN101998641A, Published March 30, 2011, Printed From Thomson Innovation on May 29, 2015, 2 pp.

English Bibliography for Chinese Patent Application Publication No. CN102045825A, Published May 4, 2011, Printed From Thomson Innovation on May 29, 2015, 3 pp.

PCT Pat. App. No. PCT/EP2013/000669, Written Opinion of the International Searching Authority, mailed Jun. 3, 2013, 6 pp.

European Pat. App. No. 12360019.9, Extended European Search Report, mailed Sep. 3, 2012, 7 pp.

English Bibliography for Japanese Patent Application Publication No. JP2009111781A, published May 21, 2009, printed from Thomson Innovation on Nov. 22, 2015, 3 pp.

English Bibliography for Japanese Patent Application Publication No. JP2011029743A, published Feb. 10, 2011, printed from Thomson Innovation on Nov. 22, 2015, 4 pp.

R2-124677, E-TFC Selection for HSUPA MIMO, Interdigital Communications, 3GPP TSG-RAN WG2 Meeting #79bis, Oct. 8-12, 2012, Bratislava, Slovakia, 7 pp.

R1-110496, Initial Considerations on the design for UL MIMO for HSUPA, Ericsson, 3GPP TSG RAN WG1, Meeting #63bis, Jan. 17-21, 2011, Dublin, Ireland, 16 pp.

\* cited by examiner

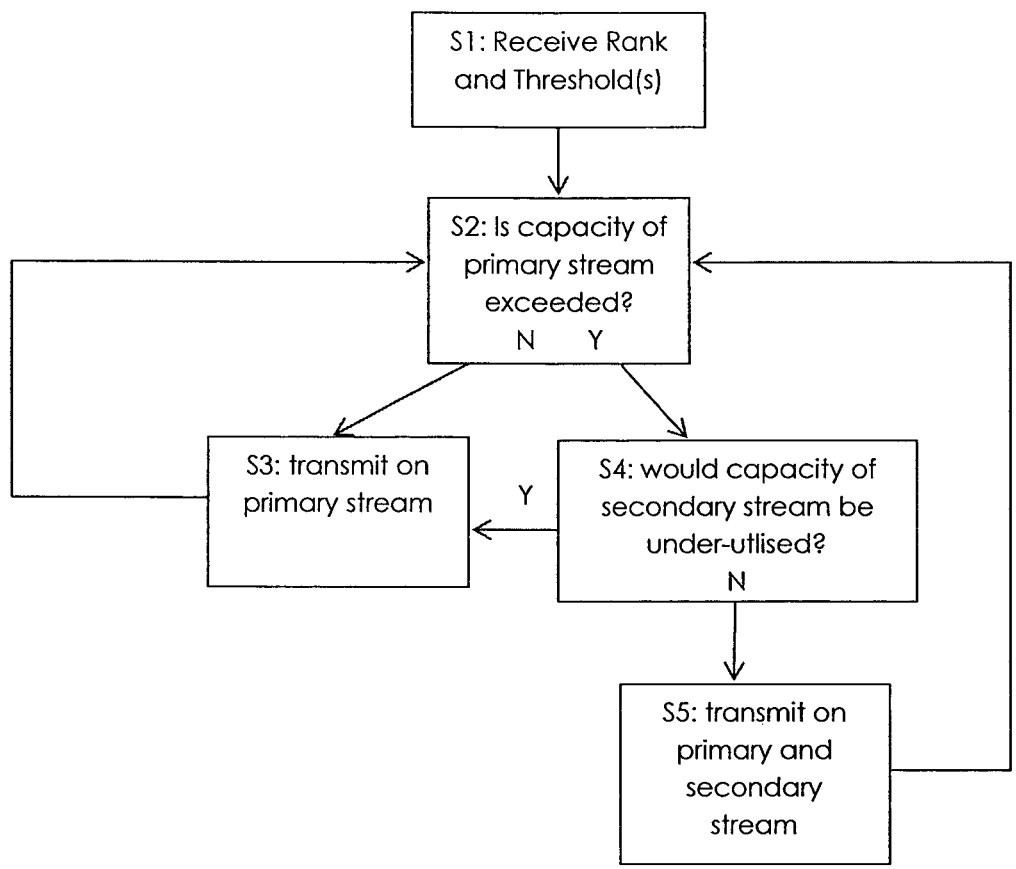

METHOD AND APPARATUS FOR RESOURCE ALLOCATION IN A MIMO COMMUNICATION SYSTEM

FIELD OF THE INVENTION

The present invention relates to a method of controlling uplink multiple input multiple output transmission between user equipment and a base station of a wireless communications network, user equipment and a computer program product.

BACKGROUND

Wireless telecommunications networks are known. Base stations in such networks provide wireless connectivity to user equipment within a geographical area or cell, associated with the base station. The wireless communication links between the base station and each of the user equipment typically include one or more downlink (or forward) channels for transmitting information from the base station to the user equipment and one or more uplink (or reverse) channels for transmitting information from the user equipment to the base station.

Multiple-input-multiple-output (MIMO) techniques may be employed when the base station and, optionally, the user equipment include multiple antennas. For example, user equipment that includes multiple antennas can transmit multiple independent and distinct signals to base stations on the same a frequency, using the same code and within the same transmission time interval (TTI) which can be resolved by the base stations. For example, individual user equipment is able to transmit two streams of Enhanced Data Channel (E-DCH) in the uplink using the same uplink resource (frequency, time and code) which means that the user equipment is capable of performing a rank two transmission (as opposed to a rank one transmission which occurs with when transmitting a single E-DCH stream).

The E-DCH consists of one or more E-DCH Dedicated Physical Data Channels (E-DPDCH) and is accompanied by one E-DCH Dedicated Physical Control Channel (E-DPCCH). The E-DPDCH carries the data traffic and the E-DPCCH carries control information to enable the E-DPDCH to be decoded.

In uplink MIMO, a secondary E-DCH stream is sent together with the primary E-DCH stream. Similar to the primary E-DCH stream, the secondary E-DCH stream consists of one or more secondary E-DPDCH (S-E-DPDCH) and one secondary E-DPCCH (S-E-DPCCH).

Although providing uplink MIMO facilitates transmissions from the user equipment to the network, unexpected consequences can occur.

Accordingly, it is desired to provide an improved technique for supporting MIMO communications.

SUMMARY

According to a first aspect, there is provided a method of controlling uplink multiple input multiple output transmission between user equipment and a base station of a wireless communications network, the method comprising the steps of: identifying whether insufficient capacity exists on a primary uplink stream to carry pending uplink data packets; and if insufficient capacity exists, preventing establishment of a secondary uplink stream when it is determined that pending uplink data packets which would not be carried by the primary uplink stream would under-utilise the secondary uplink stream.

The first aspect recognizes that a problem with existing techniques is that disproportionately high interference can occur as a result of transmitting relatively little data. This is because existing techniques is assume that the transmission power of the primary stream and the secondary stream are equal, that both the primary stream and the secondary stream utilize the highest number of codes and therefore operate at the highest capacity. A problem with this approach is that in a buffer-limited case (where there is insufficient pending uplink data to be sent), the number of data packets (the amount of information bits) that would be transmitted using the secondary stream may not use up the capacity provided by such a stream transmitting with equal power and using the highest number of codes such as, for example, 2xSF2+2xSF4 codes. This leads to the data packets transmitted in the secondary stream effectively consuming unnecessarily high power for the amount of data transmitted which in turn leads to unnecessarily high inter-stream interference and uplink interference to other users.

Accordingly, a method of controlling uplink multiple input multiple output transmissions between user equipment and base station of a wireless communications network may be provided. The method may comprise the step of identifying whether insufficient capacity exists on a primary uplink stream to carry pending or untransmitted uplink data packets. The method may also comprise the step of, when it is determined that insufficient capacity exists, the establishment of a secondary uplink stream is prevented in the event that the pending or untransmitted uplink data packets which could not be transmitted using the primary stream would under or insufficiently utilize or exploit a capacity of the secondary uplink stream.

In this way, the disproportionate interference and consumption of resources that would otherwise result from the establishment of a secondary stream in order to carry relatively little data is avoided which reduces the resources utilized, increases power efficiency and minimizes interference.

In one embodiment, it is determined that the secondary uplink stream is under-utilised when it is determined that the pending uplink data packets which would not be carried by the primary uplink stream are transmittable on the primary uplink stream within a transmission time interval. Accordingly, it is determined that the secondary uplink stream would be underutilized if all of the pending data packets which are not transmittable on the primary stream can be transmitted within a single transmission time interval. In such a case, it would be more efficient to prevent the secondary stream from being established and instead transmit those pending data packets in the next transmission time interval using the primary stream.

In one embodiment, it is determined that the secondary uplink stream is under-utilised when a difference in pending data packets which would be carried by the primary stream and by the secondary stream exceeds a threshold amount. Accordingly, an imbalance between the data packets transmitted by the primary stream and the secondary stream may indicate a potential under-utilization or inefficient use of the secondary stream.

In one embodiment, it is determined that the secondary uplink stream is under-utilised when pending data packets which would be carried by the secondary stream fails to achieve a threshold amount. Accordingly, a simple assessment of whether a particular amount of data packets are to be transmitted using the secondary stream provides an indication of whether that secondary stream will be under-utilized.

In one embodiment, it is determined that the secondary uplink stream is under-utilised when a difference between a transport block size of the primary stream and a transport block size of the secondary stream exceeds a threshold amount. Given that typically the primary stream will have an equal or larger transport block size than that of the secondary stream, the large difference in transport block size indicates that the secondary stream has very little data to transmit and it would be inefficient to transmit that amount of data using the huge capacity offered by the secondary stream.

In one embodiment, it is determined that the secondary uplink stream is under-utilised when a transport block size of the secondary stream fails to achieve a threshold amount. Accordingly, a simple assessment of the transport block size of the secondary stream may be used to determine whether the secondary stream is being under-utilized.

In one embodiment, when the primary uplink stream and the secondary uplink stream use identical modulation, it is determined that the secondary uplink stream is under-utilised when a difference in code rate of the primary stream and a code rate of the secondary stream exceeds a threshold amount. Since the two streams use the same modulation, a difference in the code rate may indicate that it is not sufficient to transmit the pending data packets using the secondary stream particularly given that the transmission power of the secondary stream is typically high.

In one embodiment, when the primary uplink stream and the secondary uplink stream use identical modulation, it is determined that the secondary uplink stream is under-utilised when a code rate of the secondary stream fails to achieve a threshold amount. Accordingly, a simple assessment of the code rate may be used to indicate that the secondary stream would be under-utilized.

In one embodiment, when the primary uplink stream and the secondary uplink stream use different modulation, it is determined that the secondary uplink stream is under-utilised when a difference in a product of a modulation order and a code rate of the primary stream and a product of a modulation order and a code rate of the secondary stream exceeds a threshold amount. The product of the modulation order and the code rate gives the number of information bits per symbol. A large difference in this product indicates that the data packets that would be transmitted on the secondary stream would be being transmitted very inefficiently compared to that of the primary stream.

In one embodiment, when the primary uplink stream and the secondary uplink stream use different modulation, it is determined that the secondary uplink stream is under-utilised when a product of a modulation order and a code rate of the secondary stream fails to achieve a threshold amount. Accordingly, a simple assessment of the product may be used to determine whether the secondary stream would be under-utilized.

In one embodiment, the method comprises the step of receiving the threshold amount from a network node. Accordingly, the degree of under-utilization can be controlled by the network setting the threshold amount.

In one embodiment, the step of preventing establishment of a secondary uplink stream prevents rank two transmissions.

In one embodiment, the step of identifying identifies that insufficient capacity exists if it is determined that all pending uplink data could not be transmitted on the primary uplink stream within a transmission time interval.

According to a second aspect, there is provided a computer program product operable, when executed on a computer, to perform the method steps of the first aspect.

According to a third aspect, there is provided user equipment operable to control uplink multiple input multiple output transmission with a base station of a wireless communications network, the user equipment comprising: identification logic operable to identify whether insufficient capacity exists on a primary uplink stream to carry pending uplink data packets; and prevention logic operable, if insufficient capacity exists, to prevent establishment of a secondary uplink stream when it is determined that pending uplink data packets which would not be carried by the primary uplink stream would under-utilise the secondary uplink stream.

In one embodiment, it is determined that the secondary uplink stream is under-utilised when it is determined that the pending uplink data packets which would not be carried by the primary uplink stream are transmittable on the primary uplink stream within a transmission time interval.

In one embodiment, it is determined that the secondary uplink stream is under-utilised when a difference in pending data packets which would be carried by the primary stream and by the secondary stream exceeds a threshold amount.

In one embodiment, it is determined that the secondary uplink stream is under-utilised when pending data packets which would be carried by the secondary stream fails to achieve a threshold amount.

In one embodiment, it is determined that the secondary uplink stream is under-utilised when a difference between a transport block size of the primary stream and a transport block size of the secondary stream exceeds a threshold amount.

In one embodiment, it is determined that the secondary uplink stream is under-utilised when a transport block size of the secondary stream fails to achieve a threshold amount.

In one embodiment, when the primary uplink stream and the secondary uplink stream use identical modulation, it is determined that the secondary uplink stream is under-utilised when a difference in code rate of the primary stream and a code rate of the secondary stream exceeds a threshold amount.

In one embodiment, when the primary uplink stream and the secondary uplink stream use identical modulation, it is determined that the secondary uplink stream is under-utilised when a code rate of the secondary stream fails to achieve a threshold amount.

In one embodiment, when the primary uplink stream and the secondary uplink stream use different modulation, it is determined that the secondary uplink stream is under-utilised when a difference in a product of a modulation order and a code rate of the primary stream and a product of a modulation order and a code rate of the secondary stream exceeds a threshold amount.

In one embodiment, when the primary uplink stream and the secondary uplink stream use different modulation, it is determined that the secondary uplink stream is under-utilised when a product of a modulation order and a code rate of the secondary stream fails to achieve a threshold amount.

In one embodiment, the user equipment comprises reception logic operable to receive the threshold amount from a network node.

In one embodiment, the prevention logic prevents establishment of a secondary uplink stream by preventing rank two transmissions.

In one embodiment, the identification logic identifies that insufficient capacity exists if it is determined that all pending uplink data could not be transmitted on the primary uplink stream within a transmission time interval.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which:

FIG. 1 illustrates the main processing steps according to one embodiment.

DESCRIPTION OF THE EMBODIMENTS

Overview

Before discussing embodiments in any more detail, first an overview will be provided. Embodiments provide a technique to select the user equipment rank for uplink MIMO.

Currently, it is proposed that the user equipment is only able to use rank 2 if both streams use 2xSF2+2xSF4 coding. The problem with this approach is that in a buffer-limited case, the amount of information bits that would be transmitted via the second stream may not use up the capacity offered by 2xSF2+2xSF4 codes. Since the transmit power for E-DPDCHs and S-E-DPDCHs are intended to be equal, the information bits in the secondary stream would consume unnecessarily high power causing:

1) Unnecessarily high inter-stream interference; and
2) Uplink interference to other users.

Embodiments impose a criterion such that rank 2 transmission is allowed (i.e. the secondary stream is established) only if the secondary stream would be sufficiently utilised. In other words, the secondary stream is only established if the benefits of doing so outweigh the impact of doing so. Various techniques are proposed for making such an assessment, as will now be described.

Transport Block Size Assessment

In this embodiment, rank 2 transmission is allowed only if the transport block size imbalance (difference) between the two streams is within a threshold. The primary stream (usually) has an equal or greater transport block size than that of the secondary stream. Hence, a large imbalance means the second stream has very little data to transmit and it is not efficient to transmit a small amount of data using the huge capacity offered by the 2xSF2+2xSF4 codes.

In another embodiment, a rank 2 transmission is allowed if the absolute transport block size for the secondary stream is above a threshold.

These thresholds can be signalled to the user equipment or may be predetermined or pre-programmed.

Code Rate Assessment

In another embodiment, if both streams use the same modulation, the criterion for rank 2 transmission is that the difference in code rate between the primary and the secondary stream is smaller than a threshold. Since a low code rate means low percentage of information bits, it is not efficient to perform rank 2 transmission for such a small amount information bits especially if the transmission power in the secondary stream is high.

In another embodiment, a rank 2 transmission is allowed if the absolute code rate for the secondary stream is above a threshold.

These thresholds can be signalled to the user equipment or may be predetermined or pre-programmed.

Modulation and Code Rate Assessment

In another embodiment, if the streams use different modulation, the criterion for rank 2 transmission is that the difference in the product of the modulation order (i.e. the number of bits per symbol, e.g. 2 for QPSK, 4 for 16 QAM) and the code rate between the two streams is smaller than a threshold. The product of the modulation order and the code rate gives the number of information bits per symbol. A small number of information bits being carried at high power is not efficient and therefore does not justify a rank 2 transmission.

In another embodiment, a rank 2 transmission is allowed if the product of the modulation order and code rate on the secondary stream is above a threshold.

These thresholds can be signalled to the user equipment or may be predetermined or pre-programmed.

Example Operation

In one embodiment, as illustrated in FIG. 1, a base station signals a maximum rank of 2 to the user equipment as step S1. The user equipment is therefore allowed in principle to transmit 2 streams. The network also signals at step S1 a transport block size (TBS) imbalance $\Delta TBS$, between the two streams, where the difference in TBS between the two streams needs to be below a threshold X if the UE is to be allowed to actually transmit with rank 2.

In the 1st TTI, the user equipment establishes at steps S2 and S4 that it has sufficient data in its buffer such that the $\Delta TBS<X$. The user equipment transmits with rank 2 at step S5.

In the 2nd TTI, the user equipment establishes at steps S2 and S4 that it has sufficient data to fill up its primary stream but has very little data left for the secondary stream.

Here $\Delta TBS>X$. The user equipment therefore transmits with rank 1 at step S3, and holds back the remaining small amount of data that would not fit into the primary stream.

In the 3rd TTI, the user equipment establishes at steps S2 that the capacity of the primary stream is not exceeded, transmits with rank 1 at step S3 and sends the remaining data in its buffer via the primary stream.

It will be appreciated that the embodiments mentioned above are based on the recognition that if only a small amount of data remains to be transmitted on the secondary stream, the extra delay incurred in making it wait one more TTI for transmission (2 ms or 10 ms in High-Speed Packet Access (HSPA)) is not significant and will typically not impact the user experience. By contrast, the extra interference that would be caused by transmitting the data on the secondary stream with high power would be significant and is desirable to be avoided.

Accordingly, embodiments prevent the secondary stream from inefficiently using unnecessarily high power to transmit a small amount of information bits in a (rank 2) buffer-limited environment.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of controlling uplink multiple input multiple output transmission between a user equipment and a base station of a wireless communications network, said method comprising:
   identifying whether insufficient capacity exists on a primary uplink stream to carry within a transmission time interval all uplink data packets pending for transmission; and
   if insufficient capacity exists, preventing establishment of a secondary uplink stream when it is determined that pending uplink data packets which would not be carried by said primary uplink stream would not sufficiently utilise a capacity provided by said secondary uplink stream within the transmission time interval.

2. The method of claim 1, wherein it is determined that said secondary uplink stream would not sufficiently use its capacity when it is determined that said pending uplink data packets which would not be carried by said primary uplink stream are transmittable on said primary uplink stream within a single transmission time interval.

3. The method of claim 1, wherein it is determined that said secondary uplink stream would not sufficiently use its capacity when a difference in a number of pending uplink data packets which would be carried by said primary uplink stream and by said secondary uplink stream exceeds a threshold amount.

4. The method of claim 1, wherein it is determined that said secondary uplink stream would not sufficiently use its capacity when a number of pending uplink data packets which would be carried by said secondary uplink stream fails to achieve a threshold amount.

5. The method of claim 1, wherein it is determined that said secondary uplink stream would not sufficiently use its capacity when a difference between a transport block size of said primary uplink stream and a transport block size of said secondary uplink stream exceeds a threshold amount.

6. The method of claim 1, wherein it is determined that said secondary uplink stream would not sufficiently use its capacity when a transport block size of said secondary uplink stream fails to achieve a threshold amount.

7. The method of claim 1, wherein when said primary uplink stream and said secondary uplink stream use identical modulation, it is determined that said secondary uplink stream would not sufficiently use its capacity when a difference in code rate of said primary uplink stream and a code rate of said secondary uplink stream exceeds a threshold amount.

8. The method of claim 1, wherein when said primary uplink stream and said secondary uplink stream use identical modulation, it is determined that said secondary uplink stream would not sufficiently use its capacity when a code rate of said secondary uplink stream fails to achieve a threshold amount.

9. The method of claim 1, wherein when said primary uplink stream and said secondary uplink stream use different modulation, it is determined that said secondary uplink stream would not sufficiently use its capacity when a difference in a product of a modulation order and a code rate of said primary uplink stream and a product of a modulation order and a code rate of said secondary uplink stream exceeds a threshold amount.

10. The method of claim 1, wherein when said primary uplink stream and said secondary uplink stream use different modulation, it is determined that said secondary uplink stream would not sufficiently use its capacity when a product of a modulation order and a code rate of said secondary uplink stream fails to achieve a threshold amount.

11. The method of claim 1, comprising receiving said threshold amount from a network node.

12. The method of claim 1, wherein said preventing establishment of a secondary uplink stream prevents rank two transmissions.

13. A non-transitory computer-readable medium storing program p instructions that, when executed by a processor, cause a processor-controlled user equipment to perform a method of controlling uplink multiple input multiple output transmission between a user equipment and a base station of a wireless communications network, the method including:
   identifying whether insufficient capacity exists on a primary uplink stream to carry within a transmission time interval all uplink data packets pending for transmission; and if insufficient capacity exists, preventing establishment of a secondary uplink stream when it is determined that pending uplink data packets which would not be carried by said primary uplink stream would not sufficiently utilise a capacity provided by said secondary uplink stream within the transmission time interval.

14. A user equipment configured to control uplink multiple input multiple output transmission with a base station of a wireless communications network, said user equipment comprising:
    at least one processor and associated memory; and
    a wireless interface configured to communicate with base stations via uplink and downlink channels;
    wherein the at least one processor is configured to identify whether insufficient capacity exists on a primary uplink stream to carry within a transmission time interval all uplink data packets pending for transmission; and
    wherein, if insufficient capacity exists, the at least one processor is configured to prevent establishment of a secondary uplink stream when it is determined that pending uplink data packets which would not be carried by said primary uplink stream would not sufficiently utilise a capacity provided by said secondary uplink stream within the transmission time interval.

15. The user equipment of claim 14, wherein the at least one processor is configured to determine that said secondary uplink stream would not sufficiently use its capacity when it is determined that said pending uplink data packets which would not be carried by said primary uplink stream are transmittable on said primary uplink stream within a single transmission time interval.

16. The user equipment of claim 14, wherein the at least one processor is configured to determine that said secondary uplink stream would not sufficiently use its capacity when a difference in a number of pending uplink data packets which would be carried by said primary uplink stream and by said secondary uplink stream exceeds a threshold amount.

17. The user equipment of claim 14, wherein the at least one processor is configured to determine that said secondary uplink stream would not sufficiently use its capacity when a number of pending uplink data packets which would be carried by said secondary uplink stream fails to achieve a threshold amount.

18. The user equipment of claim 14, wherein the at least one processor is configured to determine that said secondary uplink stream would not sufficiently use its capacity when a difference between a transport block size of said primary uplink stream and a transport block size of said secondary uplink stream exceeds a threshold amount.

19. The user equipment of claim 14, wherein the at least one processor is configured to determine that said secondary uplink stream would not sufficiently use its capacity when a transport block size of said secondary uplink stream fails to achieve a threshold amount.

20. The user equipment of claim 14, wherein when said primary uplink stream and said secondary uplink stream use identical modulation, the at least one processor is configured to determine that said secondary uplink stream would not sufficiently use its capacity when a difference in code rate of said primary uplink stream and a code rate of said secondary uplink stream exceeds a threshold amount.

21. The user equipment of claim 14, wherein when said primary uplink stream and said secondary uplink stream use identical modulation, the at least one processor is configured to determine that said secondary uplink stream would not sufficiently use its capacity when a code rate of said secondary uplink stream fails to achieve a threshold amount.

22. The user equipment of claim 14, wherein when said primary uplink stream and said secondary uplink stream use different modulation, the at least one processor is configured to determine that said secondary uplink stream would not sufficiently use its capacity when a difference in a product of a modulation order and a code rate of said primary uplink stream and a product of a modulation order and a code rate of said secondary uplink stream exceeds a threshold amount.

23. The user equipment of claim 14, wherein when said primary uplink stream and said secondary uplink stream use different modulation, the at least one processor is configured to determine that said secondary uplink stream would not sufficiently use its capacity when a product of a modulation order and a code rate of said secondary uplink stream fails to achieve a threshold amount.

24. The user equipment of claim 14, wherein the at least one processor is configured to receive the threshold amount from a network node via the wireless interface.

25. The user equipment of claim 14, wherein, in conjunction with preventing establishment of a secondary uplink stream, the at least one processor is configured to prevent rank two transmissions.

* * * * *